(12) United States Patent
Jiang et al.

(10) Patent No.: US 12,509,700 B2
(45) Date of Patent: Dec. 30, 2025

(54) PLANT FERTILITY-ASSOCIATED PROTEIN AND ITS APPLICATION THEREOF

(71) Applicant: INSTITUTE OF CROP SCIENCES, CHINESE ACADEMY OF AGRICULTURAL SCIENCES, Beijing (CN)

(72) Inventors: Bingjun Jiang, Beijing (CN); Shi Sun, Beijing (CN); Li Chen, Beijing (CN); Tianfu Han, Beijing (CN); Yanlei Yue, Beijing (CN); Wensheng Hou, Beijing (CN); Luping Liu, Beijing (CN); Shan Yuan, Beijing (CN); Tingting Wu, Beijing (CN)

(73) Assignee: INSTITUTE OF CROP SCIENCES, CHINESE ACADEMY OF AGRICULTURAL SCIENCES, Beijing (CN)

( * ) Notice: Subject to any disclaimer, the term of this patent is extended or adjusted under 35 U.S.C. 154(b) by 400 days.

(21) Appl. No.: 17/788,923

(22) PCT Filed: Apr. 16, 2020

(86) PCT No.: PCT/CN2020/085004
§ 371 (c)(1),
(2) Date: Jun. 24, 2022

(87) PCT Pub. No.: WO2021/139024
PCT Pub. Date: Jul. 15, 2021

(65) Prior Publication Data
US 2023/0175007 A1    Jun. 8, 2023

(30) Foreign Application Priority Data
Jan. 9, 2020 (CN) .......................... 202010021592.0

(51) Int. Cl.
*C12N 15/82* (2006.01)
*C07K 14/415* (2006.01)
*C12N 9/22* (2006.01)
*C12N 15/11* (2006.01)

(52) U.S. Cl.
CPC ........ *C12N 15/8289* (2013.01); *C07K 14/415* (2013.01); *C12N 9/22* (2013.01); *C12N 15/111* (2013.01); *C12N 15/8213* (2013.01); *C12N 2310/20* (2017.05)

(58) Field of Classification Search
None
See application file for complete search history.

(56) References Cited

PUBLICATIONS

Fang, Xiaolong, et al. "MS1 is essential for male fertility by regulating the microsporocyte cell plate expansion in soybean." Science China Life Sciences 64 (2021): 1533-1545. (Year: 2021).*
Palmer, Reid G., Carol L. Winger, and Marc C. Albertsen. "Four Independent Mutations at the ms1, Locus in Soybeans 1." Crop Science 18.5 (1978): 727-729. (Year: 1978).*
International Search Report issued in International Application No. PCT/CN2020/085004; mailed Oct. 16, 2020; 10 pgs.
Predicted: Glycine soja kinesin-like protein KIN-7B (LOC114381111), mRNA; GeneBank Accession No. KM_028340292; Mar. 12, 2019; 2 pgs.

* cited by examiner

*Primary Examiner* — Weihua Fan
*Assistant Examiner* — Brian James Sullivan
(74) *Attorney, Agent, or Firm* — HAUPTMAN HAM, LLP

(57) ABSTRACT

The present invention discloses a plant fertility-associated protein and its application. The present invention claims a method for obtaining male-sterile plants by reducing or inhibiting the activity and/or content of GmMS1 protein in the target plants. The present invention also claims a method for obtaining male-sterile plants by silencing or suppressing the expression of GmMS1 gene or knocking out the GmMS1 gene in the target plants. The present invention is of great significance to the research of plant fertility and the breeding of sterile plants.

2 Claims, 1 Drawing Sheet
Specification includes a Sequence Listing.

SEQUENCE LISTING

```
<160> NUMBER OF SEQ ID NOS: 25

<210> SEQ ID NO 1
<211> LENGTH: 950
<212> TYPE: PRT
<213> ORGANISM: Glycine max Linn. Merr.

<400> SEQUENCE: 1
```

Met Thr Gly Thr Pro Val Ala Val Ala Ala Thr Pro Arg Ser Lys
1               5                   10                  15

Ile Gln Arg Asn Ala Ser Gly Thr Pro Gly Gly Pro Lys Val Arg Glu
            20                  25                  30

Glu Lys Ile Arg Val Thr Val Arg Met Arg Pro Leu Asn Thr Lys Glu
        35                  40                  45

Gln Ala Met Tyr Asp Leu Ile Ala Trp Asp Cys Leu Asp Glu His Thr
    50                  55                  60

Ile Val Phe Lys Asn Pro Asn Gln Glu Arg Pro Thr Thr Pro Tyr Thr
65                  70                  75                  80

Phe Asp Lys Val Phe Ala Pro Thr Cys Ser Thr His Lys Val Tyr Glu
                85                  90                  95

Glu Gly Ala Lys Asp Val Ala Leu Ser Ala Leu Ser Gly Ile Asn Ala
            100                 105                 110

Thr Ile Phe Ala Tyr Gly Gln Thr Ser Ser Gly Lys Thr Phe Thr Met
        115                 120                 125

Arg Gly Val Thr Glu Ser Ala Ile Lys Asp Ile Tyr Asp Tyr Ile Lys
    130                 135                 140

Asn Thr Pro Glu Arg Asp Phe Ile Leu Arg Ile Ser Ala Leu Glu Ile
145                 150                 155                 160

Tyr Asn Glu Thr Val Ile Asp Leu Leu Lys Arg Glu Ser Gly Pro Leu
                165                 170                 175

Arg Leu Leu Asp Asp Pro Glu Lys Gly Thr Ile Val Glu Lys Leu Asn
            180                 185                 190

Glu Glu Val Ala Glu Asp Arg Gln His Leu Arg Arg Leu Ile Gly Ile
        195                 200                 205

Cys Glu Ala Gln Arg Gln Val Gly Glu Thr Ala Leu Asn Asp Lys Ser
    210                 215                 220

Ser Arg Ser His Gln Ile Ile Arg Leu Thr Val Glu Ser Ser Leu Arg
225                 230                 235                 240

Glu Ser Ser Gly His Val Lys Ser Tyr Ile Ala Ser Leu Asn Phe Val
                245                 250                 255

Asp Leu Ala Gly Ser Glu Arg Ile Ser Gln Thr Asn Thr Cys Gly Ala
            260                 265                 270

Arg Met Lys Glu Gly Ser His Ile Asn Arg Ser Leu Leu Thr Leu Ala
        275                 280                 285

Ser Val Ile Arg Lys Leu Ser Gly Gly Lys Cys Gly His Ile Pro Tyr
    290                 295                 300

Arg Asp Ser Lys Leu Thr Arg Ile Leu Gln Ser Ser Leu Gly Gly Asn

-continued

```
            305                 310                 315                 320
Ala Arg Thr Ala Ile Ile Cys Thr Ile Ser Pro Ser Leu Ser His Val
                325                 330                 335

Glu Gln Thr Arg Asn Thr Leu Ala Phe Ala Thr Ser Ala Lys Glu Val
                340                 345                 350

Ile Asn Thr Ala Arg Val Asn Met Val Val Ser Asn Lys Thr Leu Val
                355                 360                 365

Arg Gln Leu Gln Lys Glu Val Ala Arg Leu Gly Glu Leu Arg Ser
            370                 375                 380

Pro Asp Leu Ser Val Asn Ser Cys Leu Arg Ser Leu Leu Ala Glu Lys
385                 390                 395                 400

Glu Leu Lys Ile Gln Gln Met Glu Arg Asp Met Glu Asp Leu Arg Arg
                405                 410                 415

Gln Arg Asp Leu Ala Gln Thr Gln Leu Asp Leu Glu Arg Arg Val Asn
                420                 425                 430

Lys Val Pro Lys Gly Ser Asn Asp Cys Gly Pro Ser Ser Gln Ile Val
                435                 440                 445

Arg Cys Leu Ser Phe Pro Glu Glu Asn Lys Ser Ala Asn Gly Lys Arg
                450                 455                 460

Thr Pro Glu Arg Arg Glu Ala Val Gly Arg Gln Ala Met Leu Lys Asn
465                 470                 475                 480

Leu Leu Ala Ser Pro Asp Pro Ser Ile Leu Val Gly Glu Ile Arg Lys
                485                 490                 495

Leu Glu Asp Arg Gln Leu Gln Leu Cys Glu Asp Ala Asn Arg Ala Leu
                500                 505                 510

Glu Val Leu His Gln Asp Phe Ala Thr His Lys Leu Gly Asn Gln Glu
                515                 520                 525

Thr Ala Glu Thr Met Ser Lys Val Leu Ser Glu Ile Lys Asp Leu Val
                530                 535                 540

Ala Ala Ser Ser Thr Pro Glu Glu Ile Val Ala Ala Asp Lys Ala Asp
545                 550                 555                 560

Leu Met Glu Lys Ile Thr Gln Leu Lys Asn Gln Gly Asn Thr Ile Ala
                565                 570                 575

Ser Leu Glu Arg Lys Leu Glu Asn Val Gln Lys Ser Ile Asp Lys Leu
                580                 585                 590

Val Ser Ala Phe Asn Ala Glu Glu Thr Pro Glu Asn Lys Thr Thr Pro
                595                 600                 605

Leu Arg Arg Lys Lys Ile Leu Pro Phe Thr Leu Ser Asn Ser Pro Asn
                610                 615                 620

Met Gln His Ile Ile Arg Ala Pro Cys Ser Pro Leu Ser Ser Ser Arg
625                 630                 635                 640

Lys Ala Met Glu His Asp Ile Glu Asn Arg Ala Pro Glu Asn Asn Ile
                645                 650                 655

Gly Ile Ser Gly Ser Asp Ser Phe Ala Lys Phe His Lys Asp Thr Pro
                660                 665                 670

Arg Lys Asp Asp Lys Ser Cys Asp Ser Ile Leu Ser Arg Ala Gly Ser
                675                 680                 685

Pro Ala Thr Arg Lys Ser Lys Ser Val Asn Val Met Lys Ile Gln Lys
                690                 695                 700

Met Phe Lys Asn Ala Ala Glu Glu Asn Ile Arg Ser Phe Arg Val Tyr
705                 710                 715                 720

Val Thr Glu Leu Lys Glu Leu Val Ala Lys Leu His Tyr Gln Lys Gln
                725                 730                 735
```

```
Leu Leu Val Cys Gln Val Leu Glu Leu Glu Ala Asn Lys Ser Leu Asn
            740                 745                 750
Glu Glu Lys Asp Thr Pro Asp Arg Ser Pro Leu Pro Trp His Ile Leu
        755                 760                 765
Phe Asp Gln Gln Arg Lys Gln Ile Ile Met Leu Trp His Leu Cys His
770                 775                 780
Ile Ser Leu Val His Arg Thr Gln Phe Phe Leu Leu Leu Gly Gly Asp
785                 790                 795                 800
Pro Ser Asp Gln Ile Tyr Met Glu Val Glu Leu Arg Arg Leu Thr Arg
                805                 810                 815
Leu Glu Gln His Leu Ala Glu Leu Gly Asn Ala Ser Pro Ala Leu Leu
            820                 825                 830
Gly Asp Glu Pro Ala Gly Ser Val Ser Ala Ser Ile Arg Ala Leu Lys
        835                 840                 845
Gln Glu Arg Glu His Leu Ala Arg Lys Val Asn Thr Lys Leu Thr Ala
850                 855                 860
Glu Glu Arg Glu Leu Leu Tyr Ala Lys Trp Glu Val Pro Pro Val Gly
865                 870                 875                 880
Lys Gln Arg Arg Leu Gln Phe Val Asn Lys Leu Trp Thr Asp Pro Tyr
                885                 890                 895
Asn Met Gln His Val Gln Glu Ser Ala Glu Ile Val Ala Lys Leu Ile
            900                 905                 910
Asp Phe Ser Val Ser Asp Glu Asn Ser Lys Asp Met Ile Glu Leu Asn
        915                 920                 925
Phe Ser Ser Pro Phe Asn Lys Lys Thr Trp Ala Gly Trp Asn Phe Ile
930                 935                 940
Ser Asn Leu Leu Asn Leu
945                 950

<210> SEQ ID NO 2
<211> LENGTH: 2850
<212> TYPE: DNA
<213> ORGANISM: Glycine max Linn. Merr.

<400> SEQUENCE: 2
atgacgggaa cacctgtggc ggtggctgcg gcaacgccga ggtctaagat acagaggaat      60
gcttcaggta cgccgggtgg ccccaaagtt cgggaggaga aaattcgagt cacggttcgg     120
atgaggccgc tcaatacaaa ggagcaagct atgtacgatc taattgcttg ggattgtttg     180
gatgaacaca ctattgtgtt caagaatcca accaagagaa ggcctacaac accatacacc     240
ttcgataaag ttttgcacc tacgtgctca actcataagg tttatgaaga aggggctaaa     300
gatgttgctt tatcagcact ttctggaatc aatgcaacaa tatttgcgta tgggcagact     360
agcagtggta agacattcac gatgagaggc gtcactgaaa gtgctattaa agacatctac     420
gactacatta gaatacacc agaaagggat tttattctga aatctctgc tctggaaatc     480 tataatgaga ctgtcataga ccttctgaaa cgtgaatctg gtcctcttcg gctcttggat     540
gatcctgaga aagggactat tgtggaaaag ctgaatgaag aagtagctga agatcgtcaa     600
catcttaggc gcttaattgg catctgcgaa gctcaaggc aagtgggaga aactgcttta     660
aatgataaaa gctcaagatc acatcaaata atcaggctga ctgtagaaag cagccttcgt     720
gaaagttcag gtcacgtaaa gtcttacata gcaagtttga attttgtgga tcttgctgga     780
agtgaacgca tctctcaaac aaatacatgt ggagcaagaa tgaaggaagg cagccacatc     840
```

```
aaccgaagtt tgttgacact tgcatcagtc atcaggaagc taagtggcgg aaaatgtggt      900
cacataccat atagagactc aaaattgaca cgaatattgc agtcttcatt aggagggaat      960
gctcgaacag cgattatctg taccataagt ccttccttaa gtcatgtgga gcaaacaaga     1020
aatacactag catttgctac cagtgcaaag gaagtcatta atactgcccg agttaatatg     1080
gtcgtttcaa ataagacact agttagacag ttgcaaaagg aagttgcgag gcttgaaggg     1140
gagttacgaa gccctgacct ttctgtgaat tcatgtctaa ggtcattgct agctgaaaag     1200
gagttgaaaa ttcagcagat ggagagggat atggaagatc tgaggcgaca gagagacctt     1260
gcacaaactc aacttgatct ggaagaagaa gtgaataaag ttccaaaggg atcaaacgat     1320
tgtgggccct ctagtcaaat agtcagatgt cttcttttc ctgaagagaa caaatcagct     1380
aatggtaaac gtacgccaga gcgacgagag cagtgggca ggcaggcaat gctgaagaat      1440
ttattggctt ctcctgatcc atccatactg gttggtgaaa tccgaaagct tgaggatcgg     1500
cagctccagc tctgtgagga tgcaaatcga gctcttgaag ttctgcacca ggattttgca     1560
actcacaaac ttgggaatca agaaactgct gaaaccatgt cgaaagtact atctgaaata     1620
aaagacttag tagctgccag ctctactcca gaagaaattg tggcagcaga taaggccgac     1680
ctaatggaaa agatcacaca gttgaaaaat caagggaaca ccattgcatc tttagaaagg     1740
aagctggaga atgttcaaaa atctatagac aagcttgtgt ctgcttttaa tgcagaggag     1800
actccagaaa caagacgac ccctctgaga aggaagaaaa ttcttccttt cacattaagc      1860
aacagtccca acatgcagca tataatacgt gctccttgct cgcctctctc ctcttcgcgt     1920
aaagcaatgg aacatgacat tgagaacagg gcaccgaaaa caacattgg catctctggc      1980 agtgattctt ttgctaagtt tcataaagat actccacgaa aggatgataa agttgtgat      2040 tctattttat cacgggcagg aagcccagct acaaggaaat caaatcagt gaatgtgatg      2100 aagattcaaa agatgttcaa gaatgctgcg gaggagaaca ttcggagctt cagagtttat     2160
gttaccgagt taaaagagct agtggcaaaa ctgcattacc agaagcagct actggtttgc     2220
caggttttgg aactggaagc aaacaagtca ttaaatgaag aaaaggatac acctgatcgg     2280
tctcccttgc catggcatat actatttgat cagcagagaa agcaaattat catgttatgg     2340
catttatgcc acatatctct tgtgcaccgg acacagtttt ttcttctgtt aggaggagac     2400
ccttctgatc agatatatat ggaagttgaa cttagaagat tgactcggtt agaacagcac     2460
ctggcagagc ttgggaatgc tagtcctgca cttctaggtg atgagcctgc aggctctgtt     2520
tcagcaagca ttagagctct gaagcaagaa agggaacatc ttgctaggaa ggtgaacact     2580
aaacttacag cagaggagag ggaactgctt tatgcaaaat gggaagttcc tccagttgga     2640
aaacaaagga gactgcaatt tgtaaataaa ttgtggaccg acccttataa catgcaacat     2700
gtgcaagaaa gtgctgaaat tgtagcaaag ctcattgatt tcagtgtatc tgatgaaaac     2760
agcaaggata tgattgaatt aaacttttca agcccttta ataagaaaac atgggcgggc      2820
tggaacttta tatcaaatct tctaaatttg                                       2850
```

<210> SEQ ID NO 3
<211> LENGTH: 548
<212> TYPE: DNA
<213> ORGANISM: Artificial Sequence
<220> FEATURE:
<223> OTHER INFORMATION: Synthesized

<400> SEQUENCE: 3

```
ttcgttgaac aacggaaact cgacttgcct tccgcacaat acatcatttc ttcttagctt       60
```

```
tttttcttct tcttcgttca tacagttttt ttttgtttat cagcttacat tttcttgaac    120
cgtagctttc gttttcttct ttttaacttt ccattcggag ttttttgtatc ttgtttcata   180 gtttgtccca ggattagaat gattaggcat cgaaccttca agaatttgat tgaataaaac    240
atcttcattc ttaagatatg aagataatct tcaaaaggcc cctgggaatc tgaaagaaga    300
gaagcaggcc catttatatg ggaaagaaca atagtatttc ttatataggc ccatttaagt    360
tgaaaacaat cttcaaaagt cccacatcgc ttagataaga aaacgaagct gagtttatat    420
acagctagag tcgaagtagt gattggacgg gaacacctgt ggcgggtttt agagctagaa    480
atagcaagtt aaaataaggc tagtccgtta tcaacttgaa aaagtggcac cgagtcggtg    540
cttttttt                                                             548

<210> SEQ ID NO 4
<211> LENGTH: 20
<212> TYPE: DNA
<213> ORGANISM: Glycine max Linn. Merr.

<400> SEQUENCE: 4
gacgggaaca cctgtggcgg                                                 20

<210> SEQ ID NO 5
<211> LENGTH: 548
<212> TYPE: DNA
<213> ORGANISM: Artificial Sequence
<220> FEATURE:
<223> OTHER INFORMATION: Synthesized

<400> SEQUENCE: 5
ttcgttgaac aacggaaact cgacttgcct tccgcacaat acatcatttc ttcttagctt     60
tttttcttct tcttcgttca tacagttttt ttttgtttat cagcttacat tttcttgaac    120
cgtagctttc gttttcttct ttttaacttt ccattcggag ttttttgtatc ttgtttcata   180 gtttgtccca ggattagaat gattaggcat cgaaccttca agaatttgat tgaataaaac    240
atcttcattc ttaagatatg aagataatct tcaaaaggcc cctgggaatc tgaaagaaga    300
gaagcaggcc catttatatg ggaaagaaca atagtatttc ttatataggc ccatttaagt    360
tgaaaacaat cttcaaaagt cccacatcgc ttagataaga aaacgaagct gagtttatat    420
acagctagag tcgaagtagt gattgcgccg aggtctaaga tacaggtttt agagctagaa    480
atagcaagtt aaaataaggc tagtccgtta tcaacttgaa aaagtggcac cgagtcggtg    540
cttttttt                                                             548

<210> SEQ ID NO 6
<211> LENGTH: 20
<212> TYPE: DNA
<213> ORGANISM: Glycine max Linn. Merr.

<400> SEQUENCE: 6
cgccgaggtc taagatacag                                                 20

<210> SEQ ID NO 7
<211> LENGTH: 6884
<212> TYPE: DNA
<213> ORGANISM: Glycine max Linn. Merr.

<400> SEQUENCE: 7
ttgaagtagc cgttactata cacacctctt actatctctg gaactttgaa tttcagagcg     60
```

```
ttttttctc tttcgaaaag taaacctcgt cgtcgttcat tcgttctttc tctctttcag    120
atcgattgca gaatttattt cgccactcca aactacgtcg ttcagcattt ccaccggcga    180
ctgagcctcc tcttcttcat ctgcaagtac ttcttttctt tcatttcaca agaatcaat     240
ttctttttca ataaacgtgc tcgattagtt gaattgaatg tgcctagtaa agatcaacaa    300
gaagaagaag aagatttagc aaaatatcat atgaaacaga tgtcaatcgc catagtgaag    360
tagcggatta ctattttgtt ttttttcgg aggtgttctg ataggtgatt tgttgggcga     420
ttcagcaatt ttaaaagctt cagatcgtgc taggttttag cttaatcttc attcgctctt    480
tttgcaatgt agctaattca gaaatcgata tccgttttc tttctattac cgttttcatc     540
caaatcagtg acctccaaag ttgcaacggt tttcggaaga acatggctta gctattattt    600
ataatgttct ttatttcaag tattttctct ttagaaatga agtgctgtaa actgctgttg    660
ctgacggatc gatctgcaga aattgaaggc agagctcgat gacgggaaca cctgtggcgg    720
tggctgcggc aacgccgagg tctaagatac agaggaatgc ttcaggtacg ccgggtggcc    780
ccaaagttcg ggaggagaaa attcgagtca cggttcggat gaggccgctc aatacaaagg    840
agcaagctat gtacgatcta attgcttggg attgtttgga tgaacacact attgtgttca    900
agaatccaaa ccaagagagg cctacaacac catacacctt cggtaagttt gttttcaact    960
gtgttttttt tttccgagag gaatttgata aacttacatt tcgtgaaca gaaattcatg    1020
aatttatatt taaatttctg tataaatggg aggtaatgaa tataaacctg gttaacgttc    1080
tagtgcgttt attgtttaac gttgtttgag tggatttgta tttgttaagt ttctatttcc    1140
ttttatataa catttatctt atttgttatt tgttacttgt tacctttttt cttattatta    1200
tttgttatgt tgcagataaa gttttgcac ctacgtgctc aactcataag gtttatgaag     1260
aaggggctaa agatgttgct ttatcagcac tttctggaat caatggtaac ttgttctcag    1320
ctaatgcttg tgttagatta cgggatgttt tagatgcatt caaaagtttc atttttttgc    1380
agcaacaata tttgcgtatg ggcagactag cagtggtaag acattcacga tgagaggcgt    1440
cactgaaagt gctattaaag acatctacga ctacattaag aatgtgagtt actagtttac    1500
tgttgatacc taccaaactt tatatgtcaa ttatcttcta ctgagtataa agtagaaggc    1560
tattcatgag ttgaatccta ttagtattta tcaagattaa ttgcaggatt tgatggcaat    1620
tacttgcaat tatgaacatt ttttattcgt ttcaatttcc acagacacca gaaagggatt    1680
ttattctgag aatctctgct ctggaaatct ataatgagac tgtcatagac cttctgaaac    1740
gtgaatctgg tcctcttcgg ctcttggatg atcctgaggt atagttcagg gctaaaccct    1800
gaacggaaat ttgtcaggga tgctttaaaa tttccttgat ttgtcgcaaa tcctgaggta    1860
gattttttct ttggtacaga aagggactat tgtggaaaag ctgaatgaag aagtagctga    1920
agatcgtcaa catcttaggc gcttaattgg catctgcgaa ggtaatctag aaatctggtg    1980
tggtttgtca tgtgagacat atataggttt ctcaagagca tacagtatca ccatgttgtt    2040
tggctaagac ttttatatct cactattggt gatgttctct ttgtatagaa accatgaaaa    2100
tatataagtt gtgggcattt tgcacttagg ttatctgcat agtactattg ttcatgtaaa    2160
tattgtatct gcagctcaaa ggcaagtggg agaaactgct ttaaatgata aaagctcaag    2220
atcacatcaa ataatcaggc tggtaagctc agctgaggaa gtacaagtat tcattataat    2280
gcatgcatat ttcagattgg ttaatttacc catttatttt ctctggctac tttatgcgga    2340
gattagaaat aagacttatg cttactgctc tgtaatcact attttcatac gaatatttca    2400
gactgtagaa agcagccttc gtgaaagttc aggtcacgta aagtcttaca tagcaagttt    2460
```

```
ggtatgtttc gtcttcatag cttgacttga tagtcttgat aacaagctag tcatagtgat    2520
gaatcattat tataacctca cagaattttg tggatcttgc tggaagtgaa cgcatctctc    2580
aaacaaatac atgtggagca agaatgaagg aaggcagcca catcaaccga agtttgttga    2640
cacttgcatc agtcatcagg aagctaaggt ccaacatctt taaatatcaa aatgcatgtg    2700
gctactttgt tattgttctt ctacaaaaga gccatgatta taaaaattta gcagccaaga    2760
tcaacaagat gtagagaaaa aaaaatacta aaggcccat ttgtttgtgt gttttttttt    2820
ataagaaaaa cattttttt aaattaaaaa tatgtttaaa atctccacaa taattgattt    2880
ttttttaaat aaaaaatcct caacaagatt ttaatatttt ttgcttttaa tcatcaaatg    2940
tcacattaaa gttgtcttgt gacatgaagg taggttcaaa tctttgaaac agtcgctcta    3000
cttacagggg gataagactg cttacatcta tcctttcaat atctcactag gaagaagcct    3060
catgcaccag gctactcttt tgttcaaac tgaaagtttt ttgacaacta ctaatatact    3120
tgtggaatcc agttttctc gtaatcattt tcatttgatg actagaaatt gtttactgag    3180
gaagttggtt aatttgaaat tgtttattgt ggaagttggt taatttgaaa ttggcattga    3240
ttattattat gatgaagtaa agacctgtag agctatgtaa tttggtcaat agacaggcgt    3300
ccgattcagc ttttggaggt tttcttttgc tttgcagtgg cggaaaatgt ggtcacatac    3360
catatagaga ctcaaaattg acacgaatat tgcagtcttc attaggaggg aatgctcgaa    3420
cagcgattat ctgtaccata agtccttcct taagtcatgt ggagcaaaca agaaatacac    3480
tagcatttgc taccagtgca aaggaagtca ttaatactgc ccgagttaat atggtatgat    3540
taaatgtcta aatataatta tgatttggtt gattgaagag tagattagta tgaaaatctt    3600
ttctcctcgt gttcttatat tacttgataa aatcattttt tcccaaaaat ttgttttcaa    3660
acagaagctt gcagcagttt ggcatctttc aatcttttg acaagtgtaa atttggatag    3720
tagctctcct aggtttctga tacttagttc atagcctagc ccaccttgac tagcagcaaa    3780
gtgtatttgt ttggtagaag tatttgaaat tattgagaaa agtgatggat gcaccttctt    3840
cataaaaagc accttgtctt ttatttcggg tggcaattat agaggacttg ttttcccctc    3900
tactcgctaa gtgatattca ttttttttg ttatttcgag aagccacctc attgattaca    3960
agctttcata ttttccatga aaaagaaag gtatatacta agatagatgg tgatgatcat    4020
ttaacaggtc gtttcaaata agacactagt tagacagttg caaaaggaag ttgcgaggct    4080
tgaaggggag ttacgaagcc ctgacctttc tgtgaattca tgtctaaggt cattgctagc    4140
tgaaaaggag ttgaaaattc agcaggtaca aacttcttta cttggtctta actttcatgt    4200
taactttact gtgttaaaat ttttgaacta acctcttctc tgagtcctct agatggatat    4260
tataatggta ttctttggag ttcttacatt attattatct cttgtctcaa gatgtggtca    4320
ataatttgat ttctatgtag ctaaacattc caacattcaa gtaaaatatt catatactct    4380
ttgtgtatgc aatgggttta actttcccat tccacaatgg atcaaaatcc cgggaactgg    4440
cttcccgttg tctgctttc ttgtcgaatg aactgtgaaa gaccaattta ttagtaacac    4500
ttaattgtct tttcttgagc ttttagaaga gaaactcttt tggatgaatt gaattgataa    4560
acacaaattt gcagatggag agggatatgg aagatctgag gcgacagaga gaccttgcac    4620
aaactcaact tgatctggaa agaagagtga ataaagttcc aaaggtattt ggaatggtca    4680
tatcacatta ttgtaaccct gatttagact tctgactcaa attatataat tcttgcaggg    4740
atcaaacgat tgtgggccct ctagtcaaat agtcagatgt ctttctttc ctgaagagaa    4800
```

```
caaatcagct aatggtaaac gtacgccaga gcgacgagag gcagtgggca ggcaggcaat    4860
gctgaagaat ttattggctt ctcctgatcc atccatactg gttggtgaaa tccgaaagct    4920
tgaggatcgg cagctccagc tctgtgagga tgcaaatcga gctcttgaag ttctgcacca    4980
ggattttgca actcacaaac ttgggaatca agaaactgct gaaaccatgt cgaaagtact    5040
atctgaaata aaagacttag tagctgccag ctctactcca gaagaaattg tggcagcaga    5100
taaggccgac ctaatggaaa agatcacaca gttgaaaaat caaggaaaca ccattgcatc    5160
tttagaaagg aagctggaga atgttcaaaa atctatagac aagcttgtgt ctgcttttaa    5220
tgcagaggag actccagaaa acaagacgac ccctctgaga aggaagaaaa ttcttccttt    5280
cacattaagc aacagtccca acatgcagca tataatacgt gctccttgct cgcctctctc    5340
ctcttcgcgt aaagcaatgg aacatgacat tgagaacagg gcaccggaaa acaacattgg    5400
catctctggc agtgattctt tgctaagtt tcataaagat actccacgaa aggatgataa    5460
aagttgtgat tctattttat cacgggcagg aagcccagct acaaggaaat caaaatcagt    5520
gaatgtgatg aagattcaaa agatgttcaa gaatgctgcg gaggagaaca ttcggagctt    5580
cagagtttat gttaccgagt taaaagagct agtggcaaaa ctgcattacc agaagcagct    5640
actggtttgc caggtaaggt ttttttgattt ccactactat gctataataa tgtgtgctgc    5700
aatgctcgtt ttgccatttt aggaaaactg tttctcacat tgaatcatgt cagcatttgt    5760
ttcaggttaa acctattgca gataatgctt gtatgagttt aagactttaa gtgtaatagt    5820
aatttgttat tcttattggc gtataatatg ctgatacctt ttatcccctg cacgcacggg    5880
tttaggtttt ggaactggaa gcaaacaagt cattaaatga agaaaaggat acacctgatc    5940
ggtctccctt gccatggcat atactatttg atcagcagag aaagcaaatt atcatgttat    6000
ggcatttatg ccacatatct cttgtgcacc ggacacagtg tttctcttctg ttaggaggag    6060 acccttctga tcagatatat atggaagttg aacttagaag attgactcgg ttagaacagc    6120
acctggcaga gcttgggaat gctagtcctg cacttctagg tgatgagcct gcaggctctg    6180
tttcagcaag gtatgctcgt gtctttgaaa gacatgtgtc ttttttgaca attcctgcta    6240
gtcctgcact tctaggtgtc tttgataatt ccttaaatca agtgtctttg ataaagctcg    6300
tgtatttgaa aaacaggttt attttagaaa attctaataa attagtgcat ggccttgcac    6360
gcttttattt gtataatgag cagagaatag tatattaatc ttttgctatt gattgatcat    6420
caaatgcagc attagagctc tgaagcaaga aagggaacat cttgctagga aggtgaacac    6480
taaacttaca gcagaggaga gggaactgct ttatgcaaaa tgggaagttc ctccagttgg    6540
aaaacaaagg agactgcaat ttgtaaataa attgtggacc gacccttata acatgcaaca    6600
tgtgcaagaa agtgctgaaa ttgtagcaaa gctcattgat ttcagtgtat ctgatgaaaa    6660
cagcaaggat atgattgaat taaacttttc aagcccttt aataagaaaa catgggcggg    6720
ctggaacttt atatcaaatc ttctaaattt gtaaacacat tgttgtagtt gtacgtcatt    6780
tgtagttgag aagagaagta gagaactatc aaatatatat aatatttcga ttccattaac    6840
tgattattag gtgtacaagt ggcatgtttg caagaaagaa agaa                      6884
```

<210> SEQ ID NO 8
<211> LENGTH: 23
<212> TYPE: DNA
<213> ORGANISM: Artificial Sequence
<220> FEATURE:
<223> OTHER INFORMATION: Synthesized

<400> SEQUENCE: 8
ttggacggga acacctgtgg cgg                                        23

<210> SEQ ID NO 9
<211> LENGTH: 23
<212> TYPE: DNA
<213> ORGANISM: Artificial Sequence
<220> FEATURE:
<223> OTHER INFORMATION: Synthesized

<400> SEQUENCE: 9
aacccgccac aggtgttccc gtc                                        23

<210> SEQ ID NO 10
<211> LENGTH: 23
<212> TYPE: DNA
<213> ORGANISM: Artificial Sequence
<220> FEATURE:
<223> OTHER INFORMATION: Synthesized

<400> SEQUENCE: 10
ttgcgccgag gtctaagata cag                                        23

<210> SEQ ID NO 11
<211> LENGTH: 23
<212> TYPE: DNA
<213> ORGANISM: Artificial Sequence
<220> FEATURE:
<223> OTHER INFORMATION: Synthesized

<400> SEQUENCE: 11
aacctgtatc ttagacctcg gcg                                        23

<210> SEQ ID NO 12
<211> LENGTH: 20
<212> TYPE: DNA
<213> ORGANISM: Artificial Sequence
<220> FEATURE:
<223> OTHER INFORMATION: Synthesized

<400> SEQUENCE: 12
cgccatagtg aagtagcgga                                            20

<210> SEQ ID NO 13
<211> LENGTH: 25
<212> TYPE: DNA
<213> ORGANISM: Artificial Sequence
<220> FEATURE:
<223> OTHER INFORMATION: Synthesized

<400> SEQUENCE: 13
cagttgaaaa caaacttacc gaagg                                      25

<210> SEQ ID NO 14
<211> LENGTH: 23
<212> TYPE: DNA
<213> ORGANISM: Artificial Sequence
<220> FEATURE:
<223> OTHER INFORMATION: Synthesized

<400> SEQUENCE: 14
ttgcgccgag gtctaagata cag                                        23

<210> SEQ ID NO 15
<211> LENGTH: 23
<212> TYPE: DNA

```
<213> ORGANISM: Artificial Sequence
<220> FEATURE:
<223> OTHER INFORMATION: Synthesized

<400> SEQUENCE: 15
aacctgtatc ttagacctcg gcg                                              23

<210> SEQ ID NO 16
<211> LENGTH: 23
<212> TYPE: DNA
<213> ORGANISM: Artificial Sequence
<220> FEATURE:
<223> OTHER INFORMATION: Synthesized

<400> SEQUENCE: 16
ttggacggga acacctgtgg cgg                                              23

<210> SEQ ID NO 17
<211> LENGTH: 23
<212> TYPE: DNA
<213> ORGANISM: Artificial Sequence
<220> FEATURE:
<223> OTHER INFORMATION: Synthesized

<400> SEQUENCE: 17
aacccgccac aggtgttccc gtc                                              23

<210> SEQ ID NO 18
<211> LENGTH: 23
<212> TYPE: DNA
<213> ORGANISM: Artificial Sequence
<220> FEATURE:
<223> OTHER INFORMATION: Synthesized

<400> SEQUENCE: 18
ttgcgccgag gtctaagata cag                                              23

<210> SEQ ID NO 19
<211> LENGTH: 23
<212> TYPE: DNA
<213> ORGANISM: Artificial Sequence
<220> FEATURE:
<223> OTHER INFORMATION: Synthesized

<400> SEQUENCE: 19
aacctgtatc ttagacctcg gcg                                              23

<210> SEQ ID NO 20
<211> LENGTH: 23
<212> TYPE: DNA
<213> ORGANISM: Artificial Sequence
<220> FEATURE:
<223> OTHER INFORMATION: Synthesized

<400> SEQUENCE: 20
ttggacggga acacctgtgg cgg                                              23

<210> SEQ ID NO 21
<211> LENGTH: 23
<212> TYPE: DNA
<213> ORGANISM: Artificial Sequence
<220> FEATURE:
<223> OTHER INFORMATION: Synthesized

<400> SEQUENCE: 21
aacccgccac aggtgttccc gtc                                              23
```

```
<210> SEQ ID NO 22
<211> LENGTH: 23
<212> TYPE: DNA
<213> ORGANISM: Artificial Sequence
<220> FEATURE:
<223> OTHER INFORMATION: Synthesized

<400> SEQUENCE: 22
ttgcgccgag gtctaagata cag                                           23

<210> SEQ ID NO 23
<211> LENGTH: 23
<212> TYPE: DNA
<213> ORGANISM: Artificial Sequence
<220> FEATURE:
<223> OTHER INFORMATION: Synthesized

<400> SEQUENCE: 23
aacctgtatc ttagacctcg gcg                                           23

<210> SEQ ID NO 24
<211> LENGTH: 23
<212> TYPE: DNA
<213> ORGANISM: Artificial Sequence
<220> FEATURE:
<223> OTHER INFORMATION: Synthesized

<400> SEQUENCE: 24
gacgggaaca cctgtggcgg tgg                                           23

<210> SEQ ID NO 25
<211> LENGTH: 23
<212> TYPE: DNA
<213> ORGANISM: Artificial Sequence
<220> FEATURE:
<223> OTHER INFORMATION: Synthesized

<400> SEQUENCE: 25
cgccgaggtc taagatacag agg                                           23
```

PLANT FERTILITY-ASSOCIATED PROTEIN AND ITS APPLICATION THEREOF

RELATED APPLICATIONS

The present application is a U.S. National Phase of International Application Number PCT/CN2020/085004 filed Apr. 16, 2020, and claims priority to Chinese Application Number 202010021592.0 filed Jan. 9, 2020.

INCORPORATION BY REFERENCE

The sequence listing provided in the file entitled Amended_SQL_v2.txt, which is an ASCII text file that was created on Jun. 23, 2022, and which comprises 26,087 bytes, is hereby incorporated by reference in its entirety.

TECHNICAL FIELD

The present invention relates to the field of soybean molecular genetic breeding, in particular to a plant fertility-associated protein and its application thereof.

BACKGROUND

Soybean is the most important oil crop and high-protein food crop in the world. In China, soybean is one of the four major food crops, and it plays a very important role in ensuring national food security, improving the lives of urban and rural people, and increasing farmers' income.

Soybean is a typical short-day crop, and the suitable planting range of a single variety is mostly between 1-1.5 latitudes. The introduction of varieties between regions of different latitudes will cause the flowering time and maturity period to advance or delay due to changes in the day length, resulting in a decline in yield or even no harvest. At the same time, China has a large geographic area with many ecological types and an uneven breeding level. It is urgent to strengthen the exchange and application of excellent germplasm resources to improve the overall level of soybean breeding and increase the soybean yield level.

Soybean is a typical self-pollinated crop with small flowers and difficult emasculation, which are not conducive to the traditional artificial hybridization. This severely limits the mining and utilization of soybean germplasm resources, and severely limits the aggregation and utilization of excellent gene loci. The soybean recurrent population selection technology based on soybean male-sterile mutants can effectively broaden the genetic basis of soybean germplasm resources and has a wide range of application values.

SUMMARY OF THE INVENTION

The present invention provides a plant fertility-associated protein and its application thereof.

In the first aspect, the present invention claims a method for cultivating male-sterile plants, comprising the following steps: reducing or inhibiting the activity and/or content of GmMS1 protein in the target plants to obtain male-sterile plants;
said GmMS1 protein is as follows (A1) or (A2) or (A3):
(A1) a protein consisting of the amino acid sequence shown as SEQ ID NO. 1 of the sequence listing;
(A2) a protein derived from soybean, of which its sequence is more than 90%, 91%, 92%, 93%, 94%, 95%, 96%, 97%, 98%, or 99% identical to (A1), and which has the function of affecting soybean male sterility;
(A3) a protein which is related to plant male fertility and obtained by substituting and/or deleting and/or adding one or several amino acid residue(s) to the amino acid sequence shown in SEQ ID NO.1 of the sequence listing.

The above-mentioned protein can be artificially synthesized, or its coding gene can be synthesized first, and then obtained by biological expression.

In the second aspect, the present invention claims a method for cultivating male-sterile plants, comprising the following steps: silencing or suppressing the expression of GmMS1 gene or knocking out the GmMS1 gene in the target plants to obtain male-sterile plants:
said GmMS1 gene is any one of the following DNA molecules:
(B1) a DNA molecule whose coding sequence is shown as SEQ ID NO.2 of the Sequence Listing;
(B2) a DNA molecule whose genome sequence is shown as SEQ ID NO.7 of the Sequence Listing;
(B3) a DNA molecule that hybridizes with the DNA molecule defined by (B1) or (B2) under stringent conditions and encodes a protein with the same function;
(B4) a DNA molecule derived from soybean, of which its sequence is more than 90%, 91%, 92%, 93%, 94%, 95%, 96%, 97%, 98%, or 99% identical to the DNA sequence defined by (B1) or (B2) or (B3), and which has the function of affecting soybean male sterility.

Said stringent conditions can be as follows: hybridizing in a mixed solution of 7% sodium dodecyl sulfate (SDS), 0.5M $NaPO_4$ and 1 mM EDTA at 50° C., and rinsing in 2×SSC, 0.1% SDS at 50° C.; it can also be: hybridizing in a mixed solution of 7% SDS, 0.5M $NaPO_4$ and 1 mM EDTA at 50° C., and rinsing in 1×SSC, 0.1% SDS at 50° C.; it can also be: hybridizing in a mixed solution of 7% SDS, 0.5M $NaPO_4$ and 1 mM EDTA at 50° C., and rinsing in 0.5×SSC, 0.1% SDS at 50° C.; it can also be: hybridizing in a mixed solution of 7% SDS, 0.5M $NaPO_4$ and 1 mM EDTA at 50° C., and rinsing in 0.1×SSC, 0.1% SDS at 50° C.; it can also be: hybridizing in a mixed solution of 7% SDS, 0.5M $NaPO_4$ and 1 mM EDTA at 50° C., and rinsing in 0.1×SSC, 0.1% SDS at 65° C.; it can also be: hybridizing in a mixed solution of 6×SSC and 0.5% SDS at 65° C., and rinsing the membrane in 2×SSC, 0.1% SDS and 1×SSC, 0.1% SDS once respectively.

Said silencing or suppressing the expression of the GmMS1 gene or knocking out the GmMS1 gene in the target plant is to mutate the GmMS1 gene in the target plant to reduce the expression of the GmMS1 gene in the target plant or cause the loss-of-function of the GmMS1 gene in the target plant.

Said mutation is deletion mutation and/or insertion mutation and/or substitution mutation that occurs in exons.

Said mutation is the mutation described in (A) or (B) as follows:
(A) inserting a base A between the base 51 and base 52 at the 5'end of the sequence shown as SEQ ID NO.2 of the sequence listing;
(B) inserting a base A between the base 749 and base 750 at the 5'end of the sequence shown as SEQ ID NO.7 of the sequence listing.

Said mutation is achieved by CRISPR/Cas9 gene editing technology; said target sequence of the CRISPR/Cas9 is shown as SEQ ID NO.6 of the sequence listing.

Using CRISPR/Cas9 to cause said mutation of the GmMS1 gene of the target plant described as (A) or (B) comprises the following steps: the CRISPR/Cas9 knockout vector targeting the target sequence is introduced into the target plant to obtain a transgenic plant. Said CRISPR/Cas9 vector may specifically be a recombinant vector obtained by inserting a primer dimer into a Cas9/gRNA vector; said primer dimer is formed by annealing F2 (5'-TTGCGCCGAGGTCTAAGATACAG-3') (SEQ ID NO:14) and the primer R2 (5'-AACCTGTATCTTAGACCTCGGCG-3') (SEQ ID NO:15).

Introducing the CRISPR/Cas9 knockout vector targeting the target sequence into the target plant may specifically be: the plant cells or tissues are transformed by conventional biological methods such as *Agrobacterium*-mediated, and the transformed plant tissues are cultivated into plants.

In the embodiments of the present invention, said reducing the expression of GmMS1 gene in the genome of the target plant or causing the loss-of-function of the GmMS1 gene in the genome of the target plant can also be achieved by using CRISPR/Cas9 to cause the the mutation of the GmMS1 gene of the target plant described as the following (C) or (D):
(C) deletion mutation from base 18 to base 23 at the 5'end of the sequence shown as SEQ ID NO.2 of the sequence listing;
(D) deletion mutation from base 716 to base 721 at the 5'end of the sequence shown as SEQ ID NO.7 of the sequence listing.

The target sequence of the CRISPR/Cas9 is shown as SEQ ID NO.4 of the sequence listing.

Said causing the mutation of the GmMS1 gene of the target plant described as (C) or (D) by using CRISPR/Cas9 comprises the following steps: the CRISPR/Cas9 knockout vector targeting the target sequence is introduced into the target plant to obtain a transgenic plant. Said CRISPR/Cas9 vector may specifically be a recombinant vector obtained by inserting a primer dimer into a Cas9/gRNA vector; said primer dimer is formed by annealing F1 (5'-TTGGACGGGAACACCTGTGGCGG-3') (SEQ ID NO:16) and the primer R1 (5'-AACCCGCCACAGGTGTTCCCGTC-3') (SEQ ID NO:17).

Introducing the CRISPR/Cas9 knockout vector targeting the target sequence into the target plant may specifically be: the plant cells or tissues are transformed by conventional biological methods such as *Agrobacterium*-mediated, and the transformed plant tissues are cultivated into plants.

In the third aspect, the present invention claims the application of GmMS1 protein or its relevant biological materials in regulating plant fertility;
said relevant biological material is any one of the following (1)-(3):
(1) the coding gene of GmMS1 protein;
(2) substances used to silence or inhibit the expression of (1) or knock out (1) of the target plant;
(3) substances used to reduce or inhibit the activity and/or content of GmMS1 protein in the target plant; said GmMS1 protein is as described above.

The gene encoding said GmMS1 protein (GmMS1 gene) is as described above.

Said "substances used to silence or inhibit the expression of (1) or knock out (1) of the target plant" or "substances used to reduce or inhibit the activity and/or content of GmMS1 protein in the target plant" may specifically be a CRISPR/Cas9 knockout vector or a recombinant bacteria containing said vector; the target sequence of said CRISPR/Cas9 knockout vector is shown as SEQ ID NO.4 or SEQ ID NO.6 of the sequence listing. Said CRISPR/Cas9 vector may specifically be a recombinant vector obtained by inserting a primer dimer into a Cas9/gRNA vector; said primer dimer is formed by annealing F2 (5'-TTGCGCCGAGGTCTAAGATACAG-3') (SEQ ID NO:18) and the primer R2 (5'-AACCTGTATCTTAGACCTCGGCG-3') (SEQ ID NO:19). Said CRISPR/Cas9 vector may specifically be a recombinant vector obtained by inserting a primer dimer into a Cas9/gRNA vector; said primer dimer is formed by annealing F1 (5'-TTGGACGGGAACACCTGTGGCGG-3') (SEQ ID NO:20) and the primer R1 (5'-AACCCGCCACAGGTGTTCCCGTC-3') (SEQ ID NO:21).

In the fourth aspect, the present invention claims a specific sgRNA for CRISPER-Cas9 gene editing; the target sequence of said sgRNA is shown as SEQ ID NO.6 of the sequence listing.

The present invention also claims a vector for CRISPER-Cas9 gene editing, which expresses a specific sgRNA; the target sequence of said sgRNA is shown as SEQ ID NO.6 of the sequence listing.

Said CRISPR/Cas9 vector may specifically be a recombinant vector obtained by inserting a primer dimer into a Cas 9/gRNA annealing F2 vector; said primer dimer is formed by (5'-TTGCGCCGAGGTCTAAGATACAG-3') (SEQ ID NO:22) and the primer R2 (5'-AACCTGTATCTTAGACCTCGGCG-3') (SEQ ID NO:23).

In the fifth aspect, the present invention claims male-sterile plants.

The present invention claims male-sterile plants which are obtained by reducing or inhibiting the activity and/or content of GmMS1 protein in the target plants;
said GmMS1 protein is as follows (A1) or (A2) or (A3):
(A1) a protein consisting of the amino acid sequence shown as SEQ ID NO. 1 of the sequence listing;
(A2) a protein derived from soybean, of which its sequence is more than 90%, 91%, 92%, 93%, 94%, 95%, 96%, 97%, 98%, or 99% identical to (A1), and which has the function of affecting soybean male sterility;
(A3) a protein which is related to plant male fertility and obtained by substituting and/or deleting and/or adding one or several amino acid residue(s) to the amino acid sequence shown in SEQ ID NO.1 of the sequence listing.

The present invention also claims male-sterile plants which are obtained by silencing or suppressing the expression of GmMS1 gene or knocking out the GmMS1 gene in the target plants;
said GmMS1 gene is any one of the following DNA molecules:
(B1) a DNA molecule whose coding sequence is shown as SEQ ID NO.2 of the Sequence Listing;
(B2) a DNA molecule whose genome sequence is shown as SEQ ID NO.7 of the Sequence Listing;
(B3) a DNA molecule that hybridizes with the DNA molecule defined by (B1) or (B2) under stringent conditions and encodes a protein with the same function;
(B4) a DNA molecule derived from soybean, of which its sequence is more than 90%, 91%, 92%, 93%, 94%, 95%, 96%, 97%, 98%, or 99% identical to the DNA sequence defined by (B1) or (B2) or (B3), and which has the function of affecting soybean male sterility.

The present invention also claims male sterile plants which are different from wild-type plants in that the GmMS1 gene is mutated;

said mutation is the mutation described in (A) or (B) as follows:
(A) inserting a base A between the base 51 and base 52 at the 5'end of the sequence shown as SEQ ID NO.2 of the sequence listing;
(B) inserting a base A between the base 749 and base 750 at the 5'end of the sequence shown as SEQ ID NO.7 of the sequence listing.

The above-mentioned method for preparing the male sterile plants can refer to the first and second aspects described above.

In the sixth aspect, the present invention claims the application of any of the following in plant breeding;
(C1) any method mentioned above;
(C2) any GmMS1 protein or its relevant biological materials mentioned above;
(C3) any specific sgRNA or vector mentioned above;
(C4) any male-sterile plant mentioned above.

Any plant mentioned above is (D1) or (D2) or (D3):
(D1) dicotyledonous or monocotyledonous plant;
(D2) legumes;
(D3) soybean.

Said soybean may specifically be a soybean variety Jack.

EMBODIMENTS

Figures 1, 2:
FIG. 1 shows the sequencing results of GmMS1 gene editing.
FIG. 2 shows the sterile phenotype of GmMS1 gene-edited plants.

The following examples facilitate a better understanding of the present invention, but do not limit the present invention. The experimental methods in the following examples are conventional methods unless otherwise specified. The test materials used in the following examples, unless otherwise specified, are all purchased from conventional biochemical reagent stores. The quantitative tests in the following examples are all set to repeat the test three times, and the results are averaged.

Germination medium: 3.1 g/L B5 medium basal salt (Gamborgs Basal Salt Mixture, Phytotech G768), 20 g/L sucrose, 1 ml/L B5 medium vitamin solution (Gamborgs Vitamin Solution, Phytotech G219), 7 g/L Agar, pH 5.8.

Co-cultivation liquid medium: 2.0 g/L MS basal salt mixture (Murashige & Skoog Basal Salt Mixture), 3.9 g/L morpholine ethanesulfonic acid (MES), 30 g/L sucrose, 1 ml/L B5 medium vitamin solution (Gamborgs Vitamin Solution, Phytotech G219), 150 mg/L dithiothreitol, 40 mg/L acetosyringone, 2 mg/L zeatin, pH 5.4.

Co-cultivation medium: 2.0 g/L MS basal salt mixture (Murashige & Skoog Basal Salt Mixture), 3.9 g/L morpholine ethanesulfonic acid, 30 g/L sucrose, 1 ml/L B5 medium vitamin solution (Gamborgs Vitamin Solution, Phytotech G219), 150 mg/L dithiothreitol, 40 mg/L acetosyringone, 2 mg/L zeatin, 7 g/L agar, pH 5.4.

Recovery medium: 3.1 g/L B5 medium basal salt (Gamborgs Basal Salt Mixture, Phytotech G768), 0.98 g/L morpholine ethanesulfonic acid, 30 g/L sucrose, 1 ml/L B5 medium vitamin solution (Gamborgs Vitamin Solution, Phytotech G219), 150 mg/L cefotaxime, 450 mg/L timentin, 1 mg/L 6-benzylaminopurine, 7 g/L agar, pH 5.7.

Screening medium: 3.1 g/L B5 medium basal salt (Gamborgs Basal Salt Mixture, Phytotech G768), 0.98 g/L morpholine ethanesulfonic acid, 30 g/L sucrose, 1 ml/L B5 medium vitamin solution (Gamborgs Vitamin Solution, Phytotech G219), 150 mg/L cefotaxime, 450 mg/L timentin, 1 mg/L 6-benzylaminopurine, 7 g/L agar, 6 mg/L glufosinate, pH 5.7.

Elongation medium: 4.0 g/L MS basal salt mixture (Murashige & Skoog Basal Salt Mixture), 0.6 g/L morpholine ethanesulfonic acid, 30 g/L sucrose, 1 ml/L B5 medium vitamin solution (Gamborgs Vitamin Solution, Phytotech G219), 150 mg/L cefotaxime, 450 mg/L timentin, 0.1 mg/L 3-indoleacetic acid, 0.5 mg/L gibberellic acid, 1 mg/L zeatin, 7 g/L agar, 6 mg/L glufosinate, pH 5.6.

Rooting medium: 2.0 g/L MS basal salt mixture (Murashige & Skoog Basal Salt Mixture), 0.6 g/L morpholine ethanesulfonic acid, 20 g/L sucrose, 1 ml/L B5 medium vitamin solution (Gamborgs Vitamin Solution, Phytotech G219), 7 g/L agar, 3 mg/L glufosinate, pH 5.7.

Seeds of soybean variety Jack: reference: Wei Liu, Bingjun Jiang, Liming Ma, Shouwei Zhang, Hong Zhai, Xin Xu, Wensheng Hou, Zhengjun Xia, Cunxiang Wu, Shi Sun, Tingting Wu, Li Chen, Tianfu Han, Functional diversification of Flowering Locus T homologs in soybean: GmFT1a and GmFT2a/5a have opposite roles in controlling flowering and maturation, New Phytologist, 2018, 217 (3): 1335-1345.; the preservation number in China national germplasm bank: WDD01579, and the public can obtain it from the Institute of Crop Science, Chinese Academy of Agricultural Sciences.

Example 1. Obtaining Soybean Nuclear Male-Sterility Gene GmMS1

Sequencing and functional analysis of the soybean genome revealed a soybean nuclear male-sterility gene, which was named GmMS1 gene. Its CDS is shown as SEQ ID NO.2 of the sequence listing, and the genome sequence is shown as SEQ ID NO.7 of the sequence listing. The protein encoded by the GmMS1 gene is named GmMS1 protein, shown as SEQ ID NO.1 of the sequence listing.

Example 2. Application of GmMS1 Gene in Regulating Soybean Fertility

1. Construction of Crisper/CAS9 Gene Editing Vector
(1) the design and synthesis of the gRNA target
Designed two target sequences, which are
target 1: (SEQ ID NO:24) GACGG-GAACACCTGTGGCGGTGG (the 3-25th bases from the 5'end of SEQ ID NO.2);
target 2: (SEQ ID NO:25) CGCCGAGGTCTAAGATA-CAGAGG (the 35-57th bases from the 5'end of SEQ ID NO.2).

In target 1 and target 2, the underline sequences are the PAM sequences.

Designed two pairs of primers according to the target sequences:
Primers of Target 1:
 F1: 5'-TTGGACGGGAACACCTGTGGCGG-3' (SEQ ID NO.8);
 R1: 5'-AACCCGCCACAGGTGTTCCCGTC-3' (SEQ ID NO.9).
Primers of Target 2:
 F2: 5'-TTGCGCCGAGGTCTAAGATACAG-3' (SEQ ID NO.10);
 R2: 5'-AACCTGTATCTTAGACCTCGGCG-3' (SEQ ID NO.11).
(2) formation of primer dimer Primer F1 and primer R1 were diluted to 10 μM respectively, and the reaction system was configured as: F1 5 μl, R1 5 μl, H$_2$O 15 μl. After mixing, reacting at 95° C. for 3 minutes, then cooling to 25° C. naturally, then 16° C. for 5 minutes, and primer dimer 1 was obtained.

Primer F2 and primer R2 were diluted to 10 μM respectively, and the reaction system was configured as: F2 5 μl, R2 5 μl, H$_2$O 15 μl. After mixing, reacting at 95° C. for 3 minutes, then cooling to 25° C. naturally, then 16° C. for 5 minutes, and primer dimer 2 was obtained.

(3) The primer dimer 1 obtained in step (2) was used to configure the reaction system: Cas9/gRNA vector 1 μl, primer dimer 1 1 μl, Solution1 1 μl, Solution2 1 μl, H$_2$O 6 μl; the mixture was allowed to react at 16° C. for 2 hours.

The above-mentioned vector and reagent were from Beijing Viewsolid Biotech Co., Ltd., catalog number VK005-15.

After the reaction was over, the recombinant vector CRISPR/Cas9-GmMS1-1 was obtained. The recombinant vector CRISPR/Cas9-GmMS1-1 contains the DNA molecule shown as SEQ ID NO.3 of the sequence listing (verified by sequencing), expressing sgRNA. The target sequence of sgRNA is SEQ ID NO.4.

(4) The primer dimer 2 obtained in step (2) was used to configure the reaction system: Cas9/gRNA vector 1 μl, primer dimer 2 1 μl, Solution1 1 μl, Solution2 1 μl, H$_2$O 6 μl; the mixture was allowed to react at 16° C. for 2 hours.

The above-mentioned vector and reagent were from Beijing Viewsolid Biotech Co., Ltd., catalog number VK005-15.

After the reaction, the recombinant vector CRISPR/Cas9-GmMS1-2 was obtained. The recombinant vector CRISPR/Cas9-GmMS1-2 contains the DNA molecule shown as SEQ ID NO.5 of the sequence listing, expressing sgRNA (verified by sequencing). The target sequence of sgRNA is SEQ ID NO.6.

2. Preparation of Recombinant *Agrobacterium*

The recombinant vector CRISPR/Cas9-GmMS1-1 and the recombinant vector CRISPR/Cas9-GmMS1-2 constructed in step (3) and step (4) were respectively introduced into *Agrobacterium tumefaciens* EHA105, and recombinant *Agrobacterium* GmMS1-1 and recombinant *Agrobacterium* GmMS1-2 were obtained.

3. Obtaining Genetically Edited Soybeans

The recombinant *Agrobacterium* obtained in step 2 was used to transform soybeans by the soybean cotyledonary node transformation method mediated by *Agrobacterium tumefaciens*. The specific transformation method was as follows:

(1) The plump seeds of the soybean variety Jack with uniform size and smooth surface, without disease spots, cracks, and wrinkles, were selected and put into a glass petri dish. Then the glass petri dish was put into a desiccator and opened. A glass beaker was put into the desiccator, first 100 mL of sodium hypochlorite was added and then 4 mL of concentrated hydrochloric acid was dropped into the beaker. Vaseline was spread around the cover of the desiccator and then the desiccator was covered to become a sealed state. Then the desiccator was put into a fume hood, and the seeds were sterilized for 16-20 h.

(2) After step (1) was finished, the sterilized seeds were put into the germination medium with hypocotyl vertically upward. The Petri dish was unsealed and placed in a tissue culture room at 25° C., 16 h light/18 h dark for 1 d.

(3) After step (2) was finished, the cotyledonary nodes of germinated soybean seeds were taken as explants. First the seed coat of soybean was peeled off, then it was cut longitudinally to separate the two cotyledons. A strip wound was made at the junction of the cotyledon and the hypocotyl (cotyledonary node). The scratched explants were put into the co-cultivation liquid medium containing the recombinant *Agrobacterium* resuspension (the OD value of the bacterial solution was 0.6-0.8), infection for 30 minutes at 28° C. After infection, the explants (cotyledons) were inoculated into a co-cultivation medium covered with filter paper on the surface with the inner planes downward, and cultivated for 5 days at 25° C., 16 h light/18 h dark.

(4) After completing step (3), the explants were transferred to the recovery medium and cultured for 7 days under the conditions of 25° C., 16 h light/18 h dark.

(5) After completing step (4), the main buds produced by the explants were cut off, then the explants were transferred to the screening medium, and cultured for 21 days under the conditions of 25° C., 16 h light/18 h dark.

(6) After completing step (5), the browned leaves were peeled off, and the adventitious buds were transferred to the elongation medium for elongation. Subcultures were prepared every 15 d and 2-3 times. During the period, the elongated shoots produced were transferred to the rooting medium for rooting.

(7) After completing step (6), when the roots grew out, the seedlings were taken out from the culture medium and transplanted into a small pot with substrates for hardening-off. After hardening for 1 week the seedlings were transferred to larger pots for growth, and the TO generation plants were obtained.

(8) The TO generation plants were tested, and the test methods were as follows:

the genomic DNA of transgenic plants and wild-type plants were respectively extracted and used as a template for PCR amplification with detection primers.

F-614: CGCCATAGTGAAGTAGCGGA (SEQ ID NO.12);

R-614: CAGTTGAAAACAAACTTACCGAAGG (SEQ ID NO.13).

PCR reaction conditions: first 95° C. pre-denaturation for 5 minutes; then 95° C. for 30 sec, 56° C. for 30 sec, 72° C. for 1 min, 35 cycles; then 72° C. extension for 10 minutes. The PCR products were sent for sequencing and the gene-edited plants were screened.

The sequencing results showed that after the soybeans were transformed by the recombinant *Agrobacterium* GmMS1-1, a total of 60 TO generation plants were obtained, and one plant in the T1 progeny was a plant with mutation in the GmMS1 gene and the mutation was a homozygous mutation. Compared with the wild type, the difference of the homozygous mutant plant was: there was a 6 bp deletion, which was located between the 18th and 23rd positions of SEQ ID NO.2 (GGCGGT). After the soybeans were transformed by the recombinant *Agrobacterium* GmMS1-2, a total of 56 TO generation plants were obtained, and 5 plants in the T1 progeny were plants with mutations in the GmMS1 genes and the mutations were homozygous mutations. Compared with the wild type, the difference of the homozygous mutant plants was: there was a difference of one nucleotide (that was, an insertion-mutation occurred and it was homozygous. The insertion was located between positions 51 and 52 of SEQ ID NO.2, and the inserted single base was A. The sequencing results were shown in FIG. 1.). This difference of the nucleotides causes a frameshift which prevents the efficient expression of GmMS1 protein (FIG. 1).

4. The Soybean Fertility Test

Plants to be tested: wild-type plants, 5 homozygous mutant plants (insertion-mutant plants obtained from transformation of recombinant *Agrobacterium* GmMS1-2).

Planted plants to be tested in pots under natural outdoor conditions.

The results were shown in FIG. 2. The results showed that the wild-type control plants had normal pods and plump grains. The homozygous plants of the GmMS1 gene-edited frameshift mutation were male-sterile plants and could not form pods normally. These results indicate that editing the GmMS1 gene can lead to male sterility.

INDUSTRIAL APPLICATION

The present invention is of great significance to the research of plant fertility and the breeding of sterile plants.

The invention claimed is:

1. A method for cultivating a male-sterile soybean variety, comprising a step of knocking out the GmMS1 gene in target plants having a non-mutated GmMS1 gene to obtain male-sterile plants;
   wherein the GmMS1 protein consists of the amino acid sequence shown as SEQ ID NO. 1 of the sequence listing; and
   wherein the GmMS1 gene encodes for the GmMS1 protein;
   wherein the GmMS1 gene is any one of the following DNA molecules;
   (B1) a DNA molecule whose coding sequence is shown as SEQ ID NO. 2 of the Sequence Listing; and
   (B2) a DNA molecule whose genome sequence is shown as SEQ ID NO. 7 of the Sequence Listing;
   wherein the step of knocking out the GmMS1 gene in the target plants comprises introducing a mutation into the GmMS1 gene in the target plant;
   wherein the mutation is the mutation described in (A) or (B) as follows:
   (A) inserting a base A between the base 51 and base 52 at the 5' end of the sequence shown as SEQ ID NO. 2 of the sequence listing; and
   (B) inserting a base A between the base 749 and base 750 at the 5' end of the sequence shown as SEQ ID NO. 7 of the sequence listing.

2. A method for obtaining a male-sterile soybean plant variety comprising:
   knocking out a GmMS1 gene in a target plant comprising a non-mutated GmMS1 gene;
   wherein the GmMS1 protein consists of the amino acid sequence shown in SEQ ID NO. 1 of the sequence listing;
   wherein the GmMS1 gene encodes for the GmMS1 protein; and
   wherein the GmMS1 gene is any one of the following DNA molecules;
   (B1) A DNA molecule whose coding sequence is shown as SEQ ID NO. 2 of the Sequence Listing; and
   (B2) a DNA molecule whose genome sequence is shown as SEQ ID NO.7 of the Sequence Listing;
   wherein the male-sterile soybean plant differs from a wild-type soybean plant in that the male-sterile soybean plant comprises a mutated version of the GmMS1 gene;
   wherein the mutation to the GmMS1 gene is selected from the group consisting of mutation (A) wherein a base A is inserted between base 51 and base 52 at the 5' end of the sequence shown as SEQ ID NO. 2 of the sequence listing; and mutation (B) wherein a base A is inserted between base 749 and base 750 at the 5' end of the sequence shown as SEQ ID NO. 7 of the sequence listing.

* * * * *